United States Patent
Funakubo

[11] 3,848,687
[45] Nov. 19, 1974

[54] HOLE SAW
[75] Inventor: Toshiei Funakubo, Odawara, Japan
[73] Assignee: Kabushiki-Kaisha Eishin, Tokyo, Japan
[22] Filed: Jan. 19, 1973
[21] Appl. No.: 325,060

[30] Foreign Application Priority Data
Feb. 8, 1972   Japan.............................. 47-15521

[52] U.S. Cl.................... 175/394, 175/403, 175/410
[51] Int. Cl........................... E21b 9/16, E21c 13/00
[58] Field of Search........... 175/394, 386, 409, 329, 175/330, 379, 410, 403, 404

[56] References Cited
UNITED STATES PATENTS

| | | | |
|---|---|---|---|
| 515,698 | 2/1894 | Terp .................... | 175/330 |
| 864,544 | 8/1907 | Stein ..................... | 175/394 X |
| 1,133,162 | 3/1915 | McAllister .......................... | 175/379 |
| 1,512,841 | 10/1924 | Gamble........................... | 175/394 X |
| 1,866,602 | 7/1932 | Ridgeway........................... | 175/410 |
| 2,419,901 | 4/1947 | Lake................... | 175/330 |
| 2,833,520 | 5/1958 | Owen................... | 175/409 |
| 2,846,193 | 8/1958 | Chadderdon .................... | 175/410 X |
| 2,865,608 | 12/1958 | McKenna........................ | 175/386 X |
| 3,202,228 | 8/1965 | Shuster :.............................. | 175/409 |

Primary Examiner—Frank L. Abbott
Assistant Examiner—Richard E. Favreau
Attorney, Agent, or Firm—Shlesinger, Fitzsimmons & Shlesinger

[57] ABSTRACT

A hole saw comprising a cylindrical body having a base and a cylindrical wall, flinders of super-hard alloy material connected to the free rim of the cylindrical wall defining an open end of the cylindrical body so as to project outwardly from said rim, and flinders of super-hard alloy material being extending spirally along the outer surface of the cylindrical wall so as to project outwardly therefrom in a smaller extent than the firstly-mentioned flinders.

1 Claim, 3 Drawing Figures

Fig.1
Fig.2
Fig.3
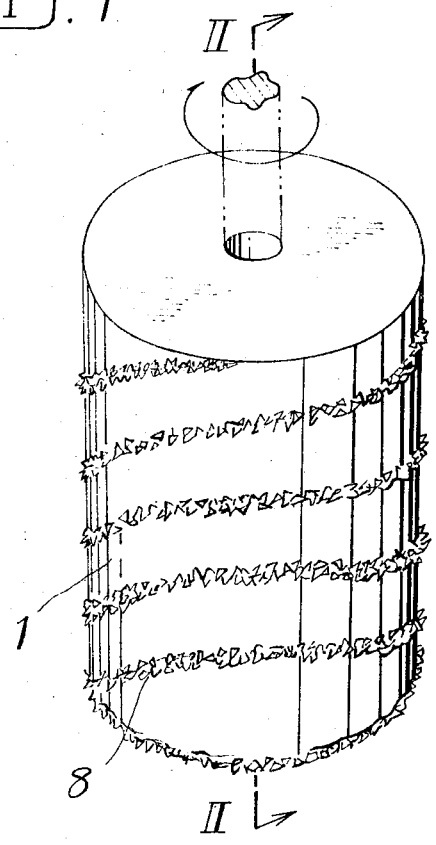
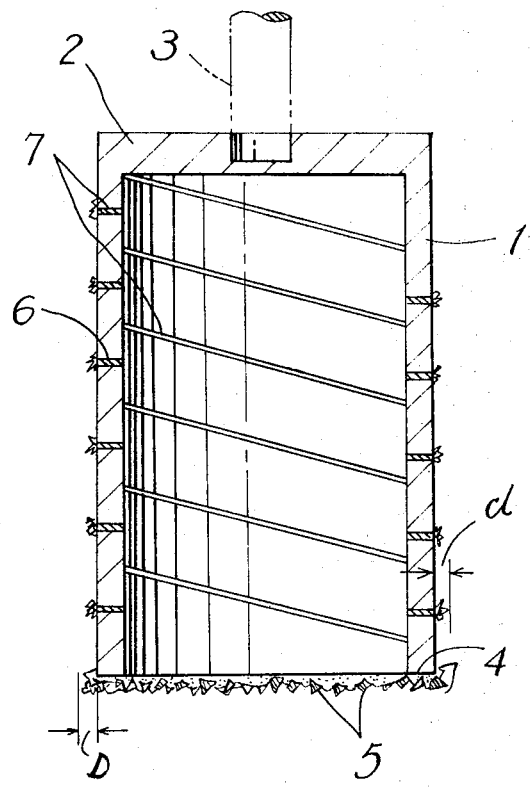
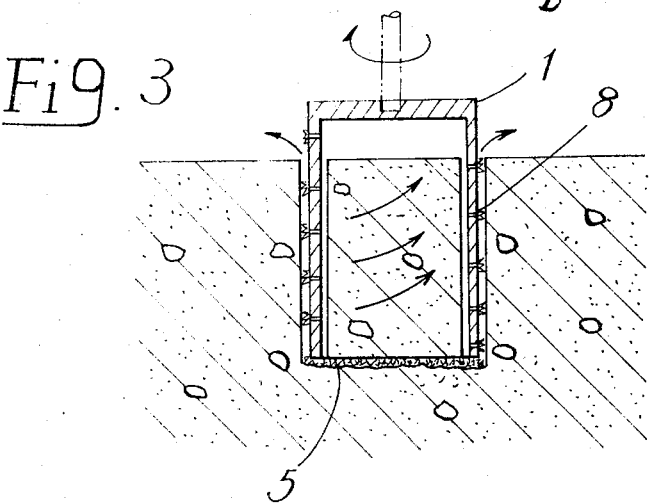

HOLE SAW

DETAILED DESCRIPTION OF THE INVENTION

This invention relates to a novel cutter belonging to a so-called hole saw.

It is generally known to use a so-called hole saw for boring a relatively large hole on various workpieces, such hole saw having axially projecting tooth projections on the open rim edge of a cylindrical body and a center drill for guide and centering. It is however usually impossible to use this hole saw for boring a relatively large hole in a concrete or similar rigid structure having complex hardness and rigidity. The demand for tools for boring larger holes through a concrete structure is however increasing gradually in recent years. For example, when it is desired to realize the change of the concrete structure with lapse of time, it is necessary to check for the ageing degree of the iron reinforcements in the concrete structure and hence to bore a hole on the concrete structure getting to the iron reinforcements thereof.

This invention has for its object to provide a hole saw suited to the above purpose.

This invention will now be described in detail by referring to the accompanying drawing.

In the drawing;

FIG. 1 is an explanatory perspective view of the hole saw according to the present invention, FIG. 2 is a longitudinal section taken along line II—II of FIG. 1, and FIG. 3 is a sectional view for illustrating the operation of the hole saw according to this invention.

The construction of the hole saw according to this invention is illustrated in the accompanying drawing, especially in FIGS. 1 and 2 thereof. A cylindrical body comprising a base 2 and a cylindrical wall 1 is made of metal and driven in rotation by a rotary shaft 3 from a suitable drive source. Flinders 5 of super-hard material are welded to the free edge 4 of the cylindrical wall 1 opposite to the base 2 thereof so as to project externally by a width D from said edge and, as the case may be, internally therefrom, while a spiral groove 6 is cut along the outer wall of the cylindrical wall 1. The base portion of a metal strip 7 of small width and having flinders 8 of the super-hard material secured to the outer edge thereof is embedded within said groove. Said flinders 8 project outwards by a width $d$ which is smaller than the above-mentioned width D. The smaller width of projection $d$ of the secondly mentioned flinders 8 than the width of projection D of the firstly mentioned flinders 5 is attained by varying the width of the metal strip 7 or the degree of projection of the metal strip 7 from the groove 6, but preferably by making the diameter of the firstly-mentioned flinders 5 larger than that of the secondly mentioned flinders 8.

The hole saw of the present invention having the abovementioned construction operates as follows:

When the cylindrical body is driven in rotation at a high speed by the rotary shaft 3 and applied to the surface of the concrete structure, the flinders 5 are advanced, describing a circle of a diameter equal to the diameter of the edge 4 added to the width D of outward projection of the flinders 5 and thus boring a hole of the said diameter. The chips of concrete are displaced as shown by the arrow in FIG. 3 along the spiral of the flinders 8 and discharged. The flinders 8 extending in a spiral serve not only for guiding the chips therealong but for additionally grinding the chips to facilitate their discharge and for reducing the occasional frictional resistance of the concrete thus preventing excess heat generation during cutting. The hole saw of the present invention is not provided with a guide drill as with conventional devices passing the center axis, but the flinders 5 projecting at random and at acute angles and the flinders 8 extending along a spiral serve to make such guide drill unnecessary. In effect, the flinders serve as guide means for the discharge of chips and advance of the cylindrical body as whole.

Among the super-hard material that make up the flinders 5 and 8 may be mentioned tungsten carbide alloys, carbide alloys consisting essentially of tungsten carbides and additionally of titanium and/or tantalum carbides, carbide alloys containing tantalum and/or vanadium carbides, boron carbides, titanium carbide alloys, ceramic alloys consisting essentially of aluminium oxides, and silicon dioxides.

What is claimed is:

1. A hole saw comprising
   a hollow cylindrical body closed at one end and having a uniformly cylindrical wall projecting from said closed end which has an annular rim around its free open end,
   flinders of super-hard alloy secured on said rim to project laterally outwardly beyond said wall,
   said wall having an external spiral groove therein, and
   means positioned in said spiral groove and carrying flinders of super-hard alloy in a spiral path around the outside of said wall and positioned to project outwardly from said wall to a less extent than the first-mentioned flinders.

* * * * *